US011104525B2

(12) United States Patent
Campedelli et al.

(10) Patent No.: US 11,104,525 B2
(45) Date of Patent: Aug. 31, 2021

(54) MACHINE FOR CONVEYING CONTAINERS

(71) Applicant: MAKRO LABELLING S.R.L., Mantova (IT)

(72) Inventors: Davide Campedelli, Mantova (IT); Davide Vezzoni, Mantova (IT)

(73) Assignee: MAKRO LABELING S.R.L., Mantova (IT)

( * ) Notice: Subject to any disclaimer, the term of this patent is extended or adjusted under 35 U.S.C. 154(b) by 0 days.

(21) Appl. No.: 16/644,834

(22) PCT Filed: Sep. 15, 2018

(86) PCT No.: PCT/IB2018/056760
§ 371 (c)(1),
(2) Date: Mar. 5, 2020

(87) PCT Pub. No.: WO2019/049032
PCT Pub. Date: Mar. 14, 2019

(65) Prior Publication Data
US 2021/0070554 A1    Mar. 11, 2021

(30) Foreign Application Priority Data

Sep. 7, 2017   (IT) .......................... 102017000100513

(51) Int. Cl.
*B65G 54/02*    (2006.01)
*B65C 9/06*    (2006.01)
*B65G 47/88*    (2006.01)

(52) U.S. Cl.
CPC ................ *B65G 54/02* (2013.01); *B65C 9/06* (2013.01); *B65G 47/8815* (2013.01); *B65G 2201/0244* (2013.01); *B65G 2205/00* (2013.01)

(58) Field of Classification Search
CPC ................ B65G 47/8815; B65G 54/02; B65G 2201/0244; B65G 2205/00; B65C 9/02; B65C 9/06
See application file for complete search history.

(56) References Cited

U.S. PATENT DOCUMENTS 9,045,291 B2 *   6/2015   Konrad .................. B65G 47/71
9,096,073 B2 *   8/2015   Buchkremer .......... B41J 3/4073
(Continued)

FOREIGN PATENT DOCUMENTS

DE    102010020958    11/2011
DE    102011086708    5/2013
DE    102013100627    7/2014

*Primary Examiner* — Gene O Crawford
*Assistant Examiner* — Keith R Campbell
(74) *Attorney, Agent, or Firm* — Workman Nydegger

(57) ABSTRACT

A machine for conveying containers is disclosed. The machine may include a guide, a main carriage slidably mounted on the guide, an auxiliary carriage slidably mounted on the guide, a pressing device mounted on the main carriage and movable between a raised and a lowered position, in which the pressing device applies a pressing force, a control unit electrically connected to the guide and configured for controlling the main carriage and the auxiliary carriage on the guide and a mutual distance thereof, an actuator connected to the pressing device and configured to move the pressing device between the raised position and the lowered position. The control unit is configured to command the variation of the mutual distance between the main carriage and the auxiliary carriage so as to activate the actuator, which is operatively interposed between the pressing device and the auxiliary carriage.

13 Claims, 10 Drawing Sheets

(56) References Cited

U.S. PATENT DOCUMENTS

| | | | |
|---|---|---|---|
| 9,604,743 B2* | 3/2017 | Nitsch | B65B 35/54 |
| 9,604,795 B2* | 3/2017 | Aumann | B65G 54/02 |
| 9,834,392 B2* | 12/2017 | Raffaini | B65G 47/082 |
| 10,518,987 B2* | 12/2019 | Marcantoni | B65C 9/045 |
| 10,640,300 B2* | 5/2020 | Achterberg | B65G 47/244 |
| 2017/0369254 A1* | 12/2017 | Muller | B65G 47/32 |
| 2018/0222042 A1* | 8/2018 | Prussmeier | B25J 5/005 |
| 2020/0283182 A1* | 9/2020 | Campedelli | B65C 9/04 |

* cited by examiner

MACHINE FOR CONVEYING CONTAINERS

TECHNICAL FIELD

The present invention relates to a machine for conveying containers. Specifically, the invention relates to the movement mechanism of the press suitable for blocking in position the container transported into the conveying machines.

The invention relates to the technical field of linear motors and of how these, coupled with conveyor machines, enable transport of containers along the production line.

PRIOR ART

At present, conveying machines used for operating on containers are, at least for the most part, of the rotating carousel type. The carousel has, on a periphery thereof, predefined container supporting stations (commonly referred to as a "support plate") on which the containers to be treated are positioned. In particular, the carousel has a central rotation axis and for the support plates has respective rotation axes parallel to the central axis.

Each support plate is rotatable about itself by taking the movement mechanically from the rotation of the carousel (for example by means of cam members or the like) or, in the most recent machines, is provided with its own electric motor that is commandable by a control unit independently with respect to the rotation of the carousel. In this way, the container loaded on the support plate can be rotated according to the operating units arranged along the carousel. For example, in order to carry out labelling operations on the container, it is necessary to perform a preliminary rotation of the container on itself in order to detect the application position of the label (by means of a suitable detecting sensor) in order then to arrange the container in the position prior to or at the labelling unit. During this procedure, in order not to make errors due to the displacement or falling of the container, it becomes necessary to keep the latter firmly in position on the rotating support plate by use of a jack. This constraining system using a jack, as illustrated in patent WO2017103813, can be mounted on magnetised carriages, which, coupled with a specific guide, define a linear motor, of which the magnetised carriages are the rotor while the guide is the stator.

However, the present technology has some drawbacks that the invention seeks to obviate.

In fact, for this purpose a pressure system is normally used, which consists of a press that is vertically movable either due to a pneumatic system, for example an air system, or due to a spring system, in which a jack presses the top of a container downwards due to the compressive or extensive work of a spring.

A first drawback, however, is natural wear on the components used, and in this specific case the spring.

Further, the spring system is not capable of guaranteeing a constant pressure, as with the case of the pneumatic system, as the force generated depends linearly on the length of the compression or extension of the spring itself (Hooke's law). Once the spring has been chosen, which is characterised by a specific elastic constant value, a correct dimensioning of the structure of the device comprising the spring is necessary; in fact, it is usually necessary to have a stroke of about 35 mm for the movement of the jack and for the compression or extension of the spring. Alternatively, the pneumatic system, even if capable of generating the same pressure all the time, independently of the displacement of the jack, would need a pressure regulator for each valve associated to each container and a rotary air distributor, thus complicating the structure and increasing the final cost.

A further drawback of the prior art relates to the fact that the rated height of the containers, in reality, is not always the same but can vary by more or less, even by up to a few millimetres, which compromises the operation of the spring system.

Lastly, the containers are usually made of glass or plastic, but these two materials are capable of withstanding different maximum pressures, while the spring system is dimensioned such as to work in a single configuration, so changing the containers would make it necessary to reconfigure the whole spring system.

SUMMARY

In this context, the technical task of the present invention is to provide a machine for conveying containers, which obviates the above-mentioned drawback of the prior art, with reference to a pressing device used to constrain in position a container placed on a rotating support and in movement along a guide of the machine itself.

An object of the present invention is the possibility of using a constraining system of the container capable of generating always the same pressure on the top of the container, independently of the movement carried out by the pressing device due to the variability of the height of the containers transported.

A further object of the present invention is the use of a constraining system which does not increase the complexity of the structure of the conveying machine with the addition of electrical circuits or pneumatic systems.

Lastly, a final object of the present invention is the use of a constraining system which is capable of operating with both containers made of a plastic material and with glass containers, without any need to have to replace parts, to have to carry out calibrations or to have to use specific positioning sensors.

In general, the present invention relates to a machine for conveying containers which comprises, at the top of the containers, a guide extending along an advancement direction of the containers, a main carriage and an auxiliary carriage slidably mounted on the guide, with which both the carriages define a linear motor, and a pressing device mounted on the main carriage, which is movable between a raised rest position and a lowered constrained position in which the pressing device applies a pressing force on the top of a container.

Each container is supported from below by a support plate that is normally mobile and preferably mounted on a carriage which defines a further base linear motor.

The machine further comprises a control unit electrically connected to the guide and configured for controlling the sliding of the main carriage and the auxiliary carriage on the guide and a mutual distance thereof, and actuating means operatively connected to the pressing device and configured for moving said pressing device between the raised rest position and said lowered constrained position.

The control unit is configured for commanding the variation of the mutual distance between the main carriage and the auxiliary carriage so as to activate said actuating means, which is operatively interposed between the pressing device and the auxiliary carriage. In other words, the main carriage and the auxiliary carriage are controllable independently of one another.

Preferably, the machine comprises at least two auxiliary carriages slidably mounted on the guide, in such a way that the main carriage is interposed therebetween and each auxiliary carriage is operatively connected to the pressing device by respective actuating means.

Advantageously, having a main carriage interposed between two auxiliary carriages gives stability to the structure at the time when the pressing device is moved. Further, in a case where both the auxiliary carriages are moved in the same way towards the main carriage, the total force produced will be double that of the same movement of a single auxiliary carriage towards the main carriage.

According to a first aspect of the invention, the actuating means comprises a linkage, a first end of which is connected to the auxiliary carriage and a second end is connected to the pressing device, so that a variation of the relative distance between said main carriage and at least one auxiliary carriage induces a displacement of the pressing device between the raised rest position and the lowered constrained position.

It is further possible for this linkage to comprise three levers, each of which has a first end constrained at a same point and a second end constrained at a different point between said pressing means, said main carriage and said auxiliary carriage.

According to a second aspect of the invention, the actuating means comprises a rack connected to the auxiliary carriage and at least one nut-female screw movement system comprising the pressing device.

According to a third aspect of the invention, the actuating means comprises at least one connecting rod and at least one crank associated to the connecting rod. The connecting rod has a first end constrained to the auxiliary carriage and a second end associated to the crank, while the latter is connected to the pressing device by conversion means for converting the rotary motion into a rectilinear motion.

Preferably, the conversion means comprises a screw-female screw movement system which includes the pressing device constrained to the main carriage, in such a way that the rotation of the pressing device is prevented and movement between the raised rest position and the lowered constrained position is enabled.

According to a fourth aspect of the invention, the actuating means comprises a linkage, which has a first end constrained to the auxiliary carriage and a second end constrained to a pinion, which is mounted on the main carriage. The pinion is also capable of rotating about the constraining point and enables displacement of the pressing device between the raised rest position and the lowered constrained position, as it is associated to a threaded portion thereof, due to the reciprocal displacement between the main carriage and the carriage.

According to a fifth aspect of the invention, the actuating means comprises a cam system having at least one shaped profile solidly constrained to the auxiliary carriage and operatively associated to a slider solidly constrained to the pressing device in order to cause movement between said raised rest position and said lowered constrained position.

According to a sixth aspect of the invention, the actuating means comprises at least one actuator cylinder comprising a first piston connected to said auxiliary carriage, a second piston connected to said pressing device and a volume of fluid interposed between said first and second pistons.

Independently of the selected aspect of the invention, the use of one of the suggested actuating means, with respect to the traditional use of a spring, enables having application of a constant pressure value on the top of the container, independently of how much the pressing device has moved from the raised rest position to the lowered constrained position.

In particular, the control unit is configured to control the distance between the auxiliary carriage and the main carriage according to the maximum stroke that the pressing device must carry out (for example according to the height of the container). This control is performed by controlling the currents/voltages of the electrical circuits arranged along the guide.

A limit value of maximum stroke of the pressing device is preferably set, which defines the minimum distance limit between the auxiliary carriage and the main carriage.

Alternatively or additionally, the control unit is configured to control the pressure value exerted by the pressing device on the top of the container. This pressure value is a function of the force with which the auxiliary carriage pushes towards the main carriage or vice versa.

A maximum pressure limit value of the pressing device is preferably set, according to the characteristics of the container (for example plastic, glass, . . . ). This maximum pressure value is converted into a maximum current/voltage value which is supplied to the electrical circuits.

In fact, as the force developed by the linear motor is proportional to the current/voltage which is supplied into the electrical circuits arranged along the guide, the control unit is configured to manage the electrical magnitudes of the electrical circuits of the guide so as to control the thrust force of a carriage towards the other one and thus the pressure of the pressing device on the container.

In the preferred case, the control unit is configured to carry out two checks in a parallel way:
- a first mutual distance check of the carriages so that the distance does not exceed the predefined maximum stroke limit;
- a second pressure check of the pressing device on the container so that it does not exceed the maximum pressure limit value.

BRIEF DESCRIPTION OF THE DRAWINGS

Further characteristics and advantages of the present invention will become more apparent from the general and thus non-limiting description of a preferred, but not exclusive, embodiment of a machine for conveying containers, as illustrated in the accompanying drawings, in which.

In the following description, the same reference characters denote the same or corresponding parts in the various views.

DETAILED DESCRIPTION

The present invention relates to the technical field of machines for conveying containers, specifically to the constraining system from above of the containers during movement thereof along the production line.

Figure 1:
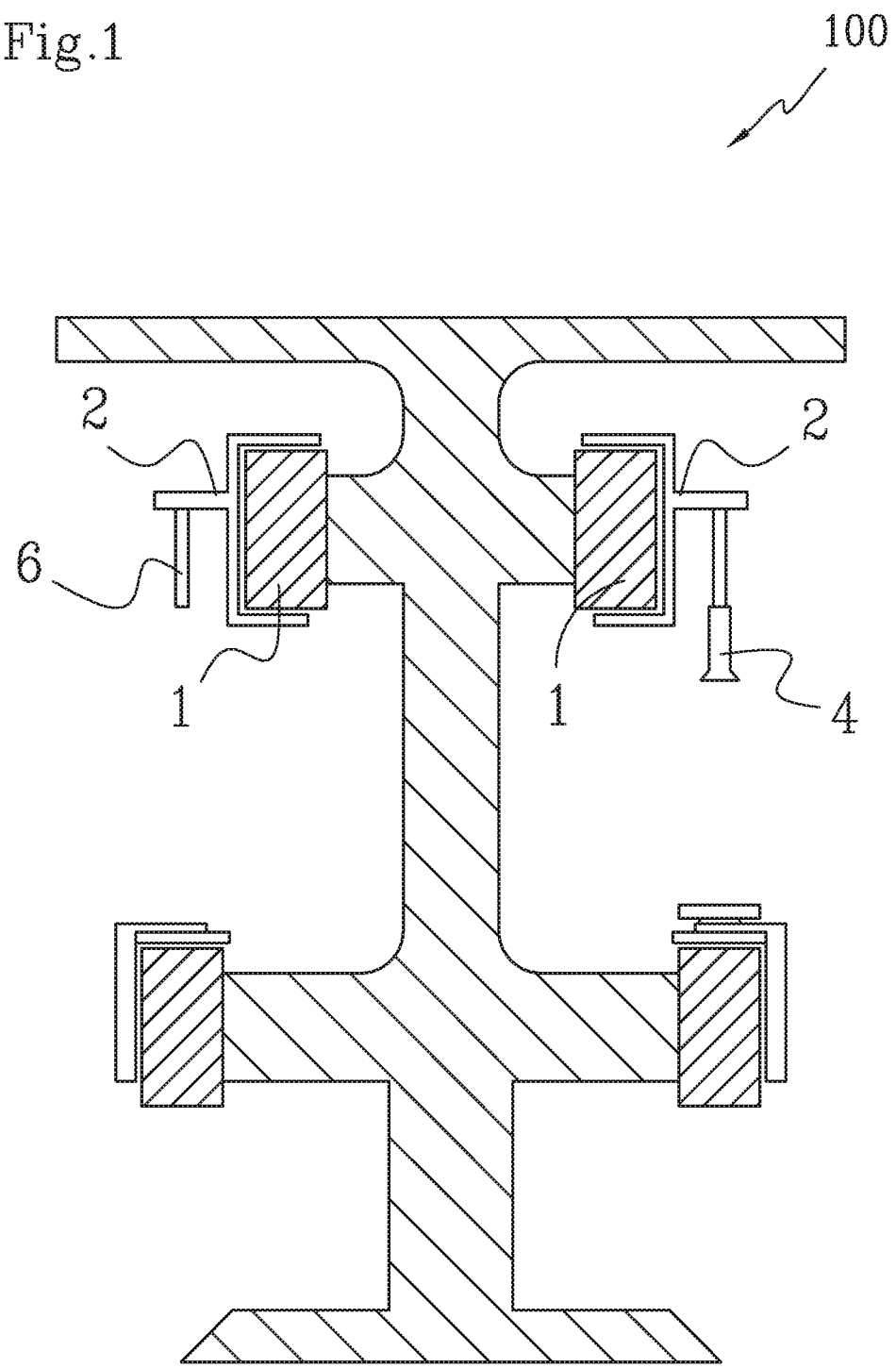
FIG. 1 illustrates, in a schematic front view, a machine for conveying containers.

With reference to the cited figures, reference numeral 100 denotes in its entirety a machine for conveying containers, as shown in FIG. 1.

Figure 2:
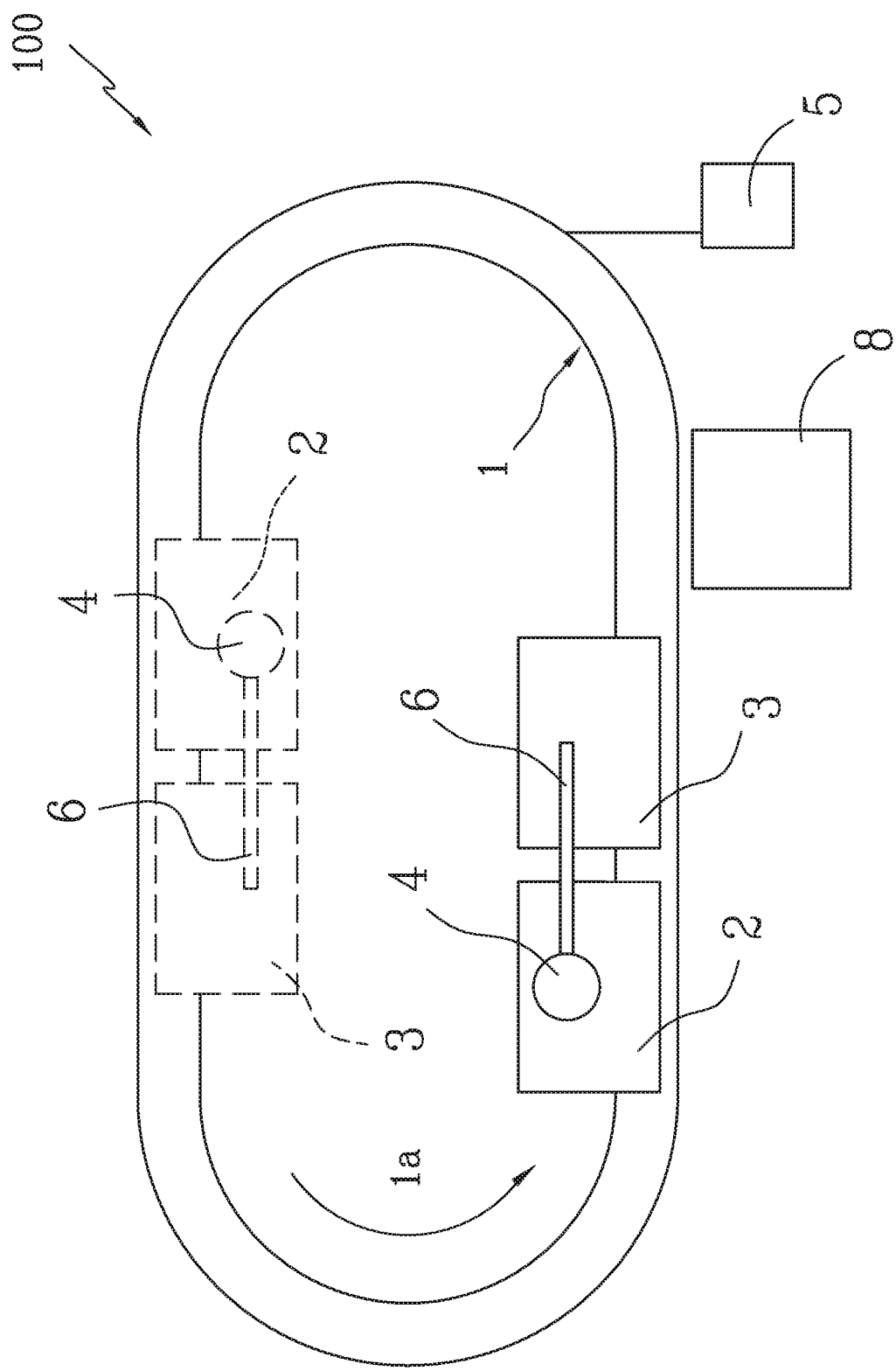
FIG. 2 illustrates, in a schematic bottom view, the sliding guide for sliding the carriages to constrain the containers.

FIG. 2 shows, with a schematic bottom view, a guide 1 which extends along an advancement direction 1a of the containers and on which at least one main carriage 2 and at least one auxiliary carriage 3 are mounted. The guide 1 can be made up of a plurality of tracks along which the various carriages are arranged, or of a single track electrically connected to a single control unit 5 for better management of the movement of the main carriage 2 and the auxiliary carriage 3.

The guide 1 is manufactured using a metallic material, generally ferromagnetic, and is electrically connected to a control unit 5 capable of precisely controlling the supply of electric current from a generator, for induction of a specific magnetic field. The main carriage 2, equipped with a magnet or produced with a conductor material, defines a linear motor together with the guide 1 supplied with electric current, in which the guide 1 acts as a stator and the main carriage 2 as a rotor. Likewise, the auxiliary carriage 3, provided with a magnet or made of a conductor material, defines together with the guide 1 a linear motor, where also in this case the guide 1 is the stator and the auxiliary carriage 3 is the rotor. The control unit 5 is programmed for a precise control of the electric current to be supplied to a specific portion of the guide 1, in such a way that the latter generates a specific magnetic field for a precise movement of the main carriage 2 and/or of the auxiliary carriage 3. In fact, it is possible to control the position and velocity of each single carriage, so that on the passage in proximity of the operating station 8, for example a labelling station, the carriages move with an adequate velocity for carrying out the necessary operations.

The main carriage 2, comprising the pressing device 4, is the carriage carrying out the vertical constraint of the containers during the movement thereof along the production line. The pressing device 4 is therefore capable of performing a vertical displacement along an axis coinciding with the main axis of the container, between a raised rest position, in which the pressing device 4 and the container are not in contact, and a lowered constrained position in which the pressing device 4 applies pressure on the top of a container. In addition to be able to vertically constrain the container, the pressing device 4 is capable of rotating about the main axis in order to follow the rotary movement of the support of the container and, consequently, of the container itself during some operations that take place along the production line, such as labelling.

In other words, the pressing device 4 is rotationally independent of the axial movement between the two positions with respect to a movement axis. In practice, the pressing device 4 does not rotate during the axial movement, but remains idle. In still other words, the pressing device 4 is movable only axially (without rotation).

The auxiliary carriage 3 is positioned upstream or downstream of the main carriage 2, with respect to the advancement direction 1a of the containers, as it has the function of accompanying the movement of the main carriage 2 in order to be able to impart the vertical translation movement to the pressing device 4.

As shown in FIG. 2, the actuating means 6 is interposed between the main carriage 2 and the auxiliary carriage 3, which actuating means 6, once activated, is capable of inducing the vertical translational motion to the pressing device 4 to which the means is operatively associated. The main carriage 2 and the auxiliary carriage 3 define a linear motor with the guide 1 and can be translated along the advancement direction 1a of the guide 1 with not necessarily equal specific velocities due to the programming of the control unit 5, which manages position and velocity with great precision, as the mutual distance thereof can be varied in order to activate the operation of the actuating means 6 with the consequent vertical movement of the pressing device 4.

Figure 3A:
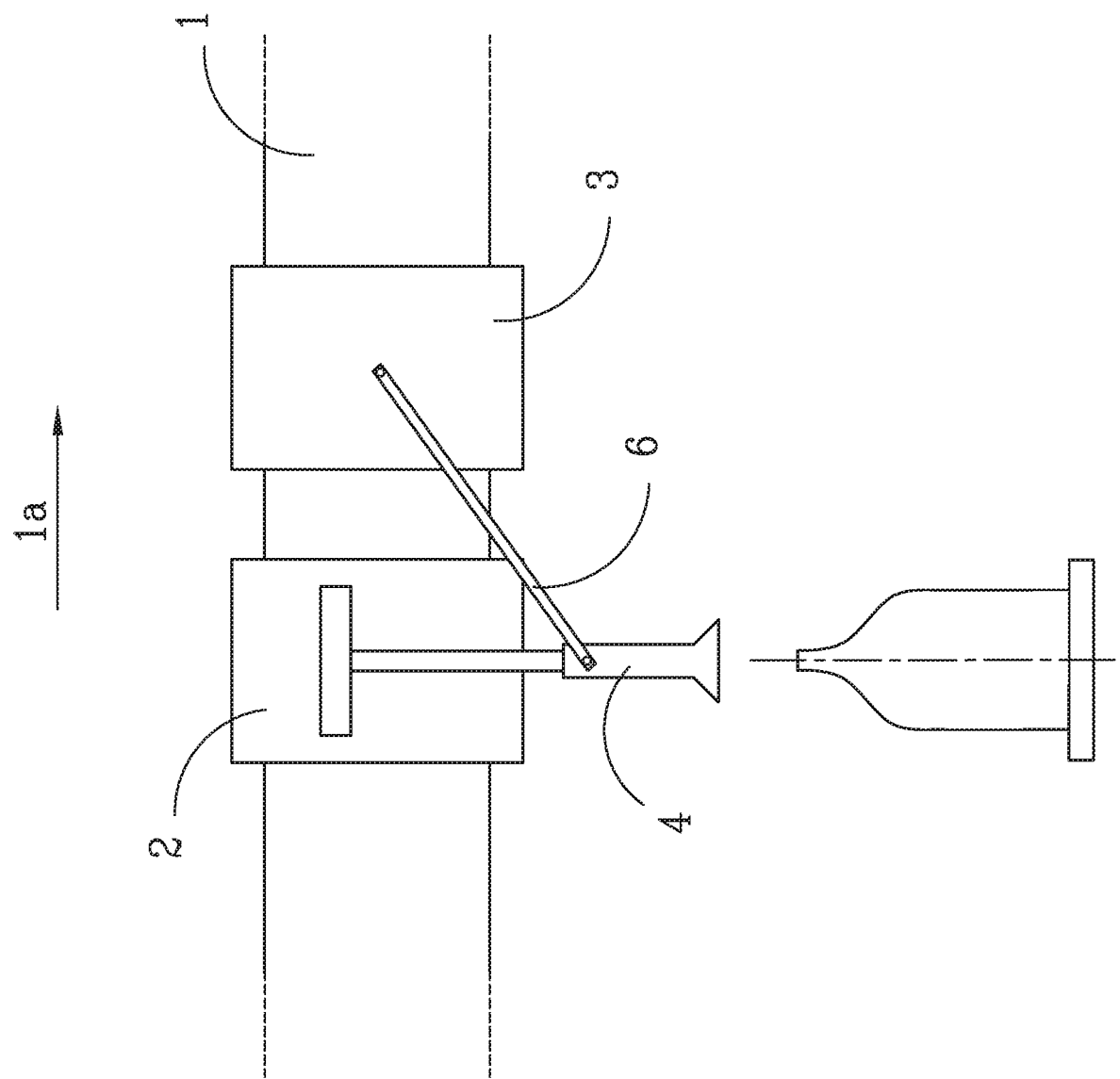
FIG. 3a illustrates, in a schematic side view, a first embodiment of the machine of the invention with a first type of actuating means.

As shown in FIG. 3a, the actuating means 6 comprises a lever, the ends of which are constrained to the auxiliary carriage 3 and to the pressing device 4. The approaching between the main carriage 2 and the auxiliary carriage 3 causes a rotation of the lever about the end constrained to the auxiliary carriage 3 with a consequent vertical downwards displacement of the pressing device 4, constrained to the opposite end of the lever itself. The displacement of the pressing device 4 between a raised rest position, in which the main carriage 2 and the auxiliary carriage 3 are at the maximum distance, and a lowered constrained position, in which the main carriage 2 and the auxiliary carriage 3 are at a minimum distance, enables application of a pressing force on the container of a first force value (for example 100 N).

Figure 3B:
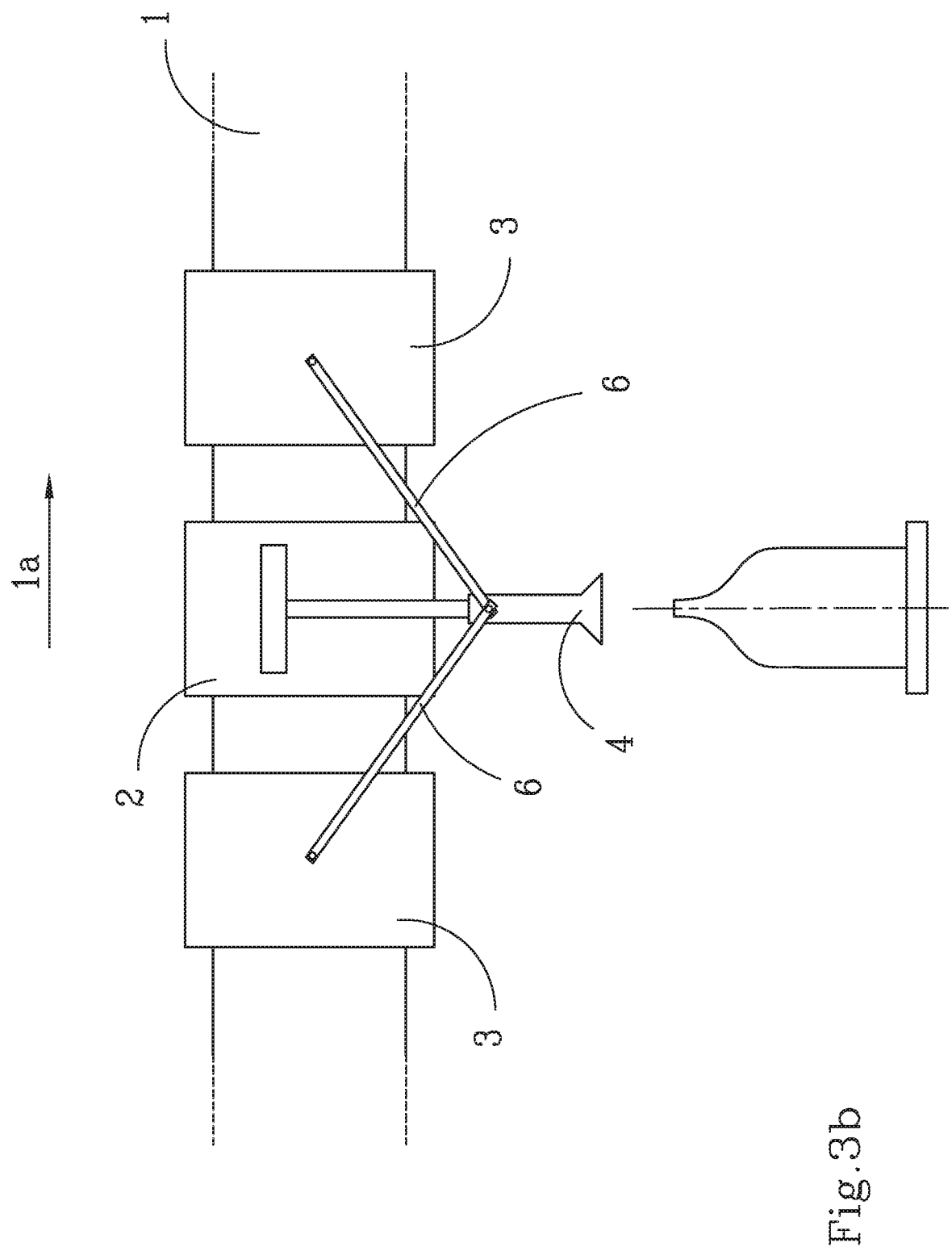
FIG. 3b illustrates, in a schematic side view, a second embodiment of the machine of the invention with a second type of actuating means.

Preferably, as illustrated in FIG. 3b, the main carriage 2 can be interposed between two auxiliary carriages 3, each of which has actuating means 6, in the specific case a lever, with a first end constrained to the auxiliary carriage 3 itself and a second end constrained to the pressing device 4. Similarly to the previous aspect, in which only one auxiliary carriage 3 is present, the relative displacement between the auxiliary carriages 3 and the main carriage 2 imposes a vertical displacement of the pressing device 4. In this case the auxiliary carriages 3, having actuating means 6 located mirror-like with respect to the pressing device 4, must synchronously move close to and away from the main carriage 2, generating a pressure on the container that can reach a second force value that is substantially double with respect to the first one (for example 200 N).

Figure 3C:
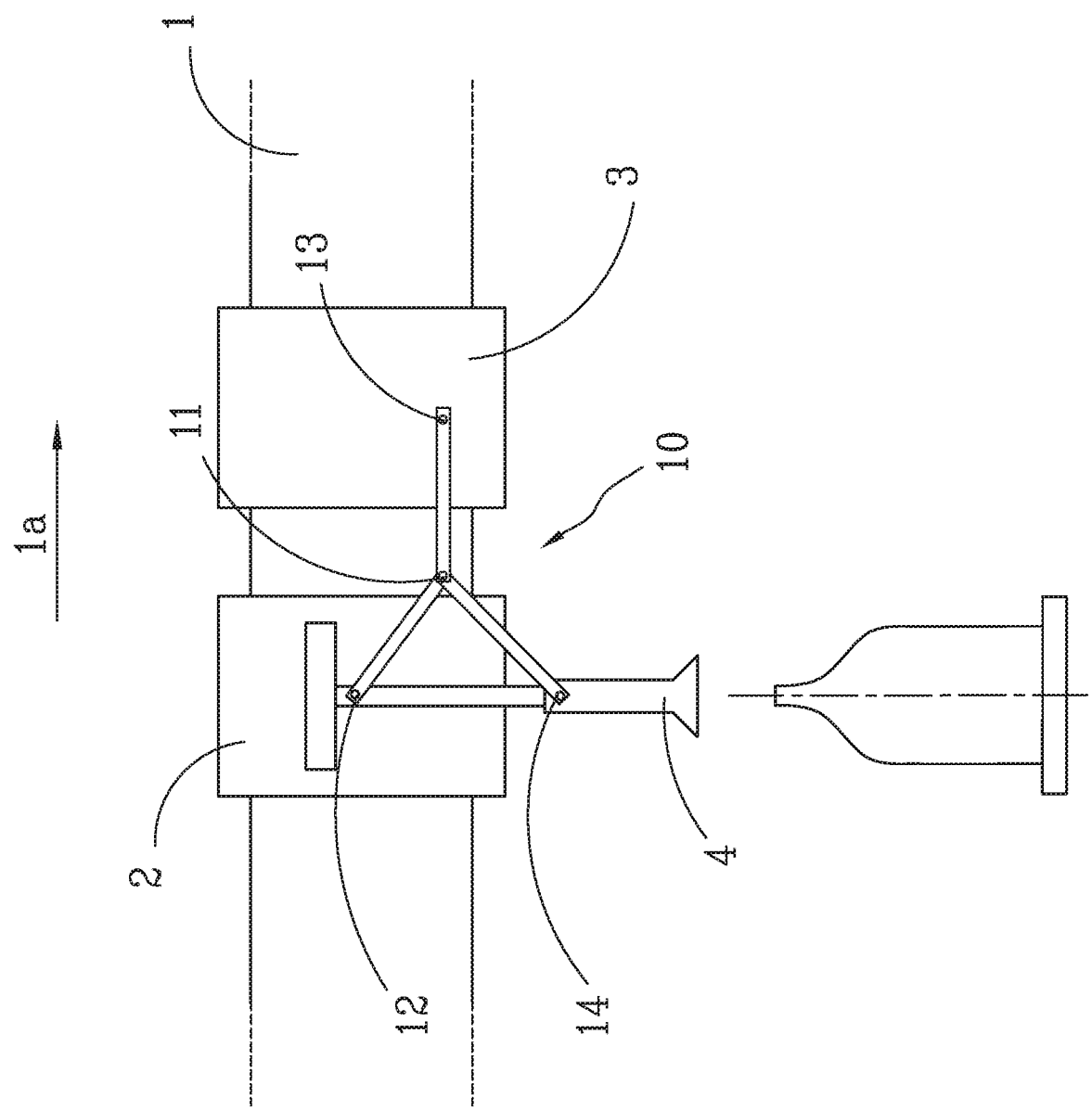
FIG. 3c illustrates, in a schematic side view, a third embodiment of the machine of the invention with a third type of actuating means.

FIG. 3c illustrates a further embodying feature of the invention, in which the actuating means 6, interposed between an auxiliary carriage 3 and a main carriage 2, comprises a linkage 10 composed of three levers, each of which has a first end constrained at a same point 11, while each of the second ends 12, 13, 14 is constrained at a different point to the others; specifically they are constrained to the main carriage 2, to the auxiliary carriage 3 and to the pressing device 4. During the approaching between the auxiliary carriage 3 and the main carriage 2, the only constraint between the lever and the pressing device 4 is able to translate, as it is capable of translating the pressing device 4 itself. In this way, with respect to the first embodying feature of the invention, it is possible to almost double the pressure that the pressing device 4 is capable of applying to the underlying container.

Figure 3D:
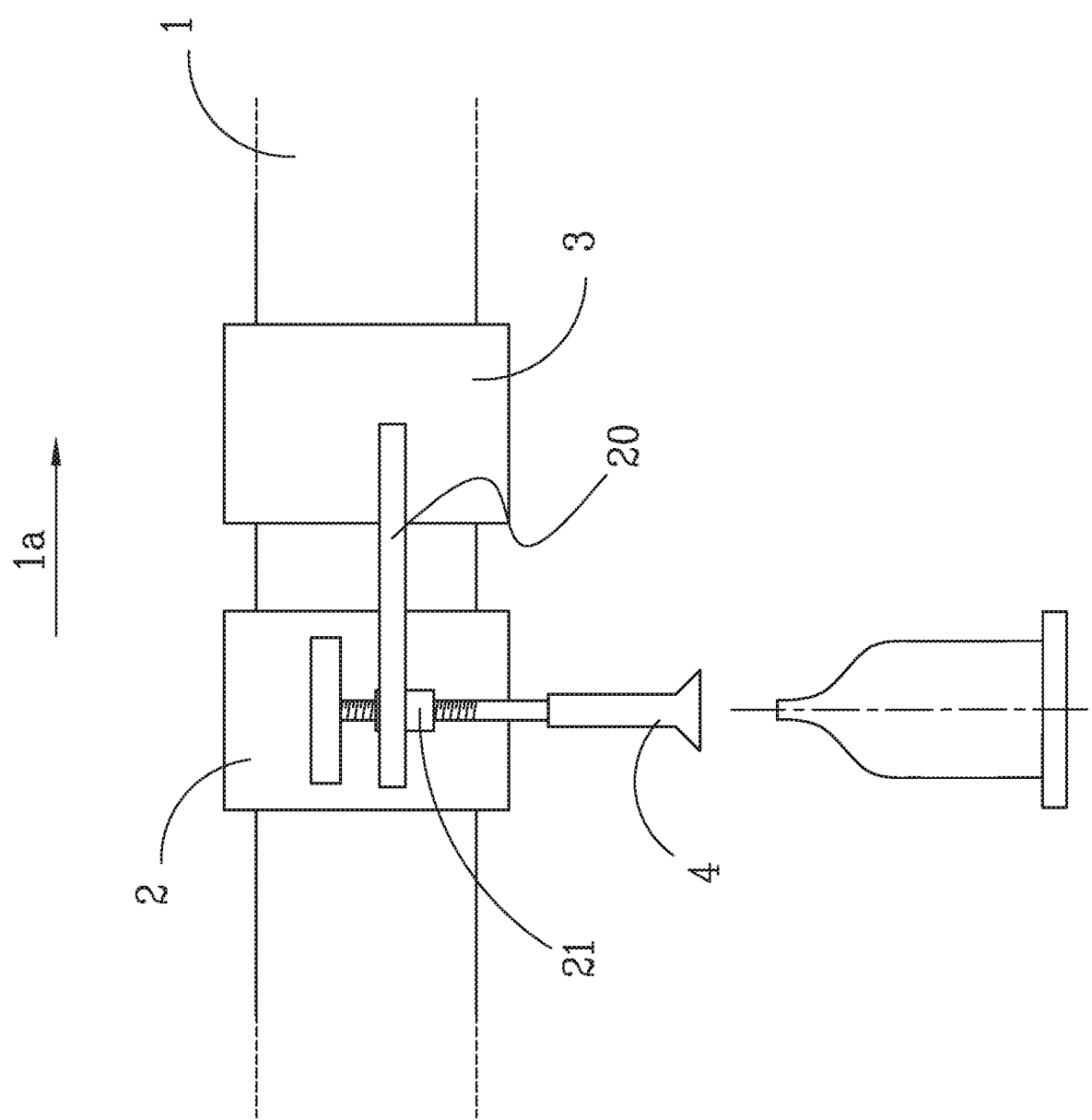
FIG. 3d illustrates, in a schematic side view, a fourth embodiment of the machine of the invention with a fourth type of actuating means.

FIG. 3d illustrates an embodiment of the invention in which the actuating means 6 comprises a rack 20 connected to the auxiliary carriage 3, the relative movement of which with respect to the main carriage 2 leads to the vertical translation of the pressing device 4 due to a screw-female screw movement system 21 associated to the rack 20.

Figure 3E:
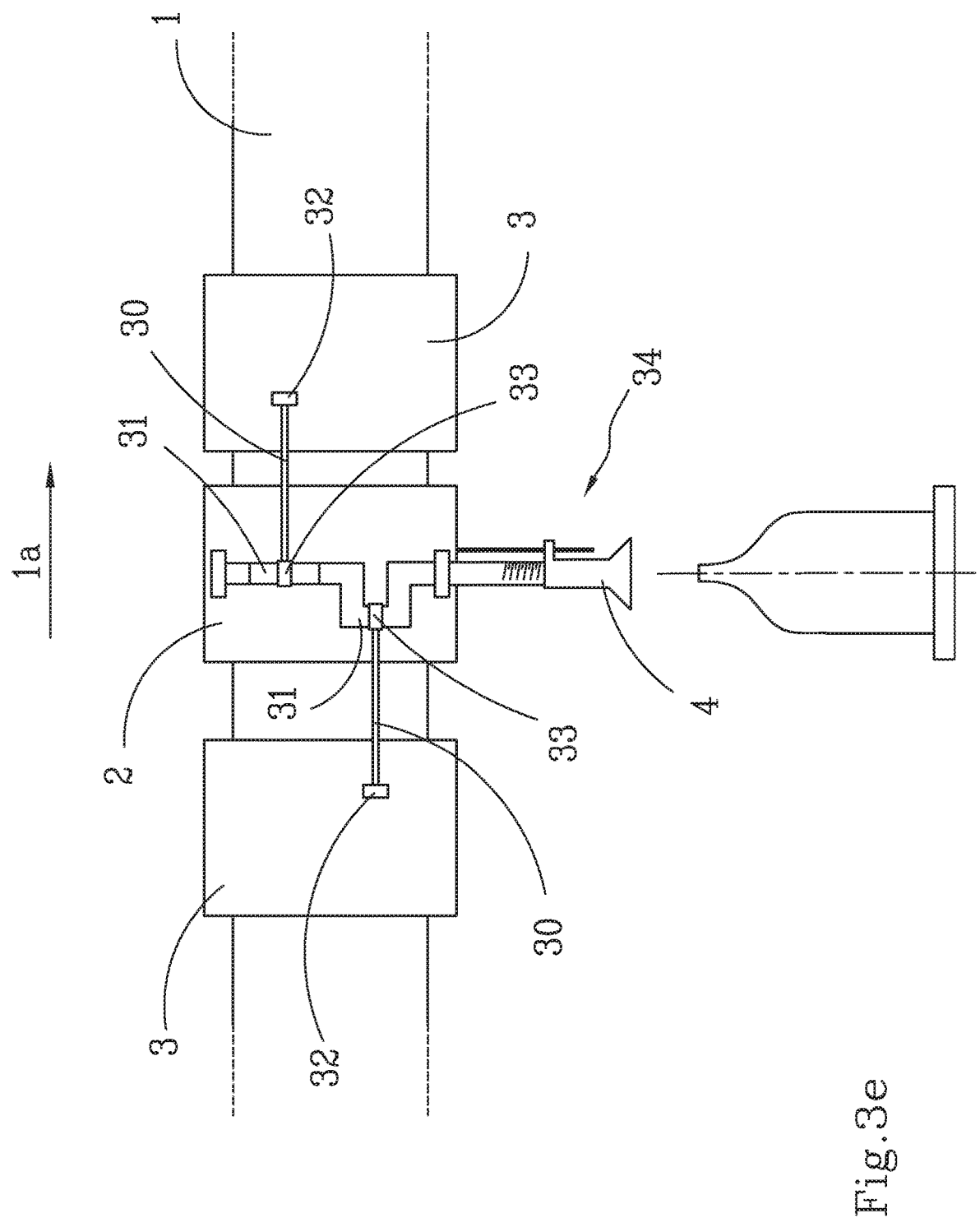
FIG. 3e illustrates, in a schematic side view, a fifth embodiment of the machine of the invention with a fifth type of actuating means.

A further aspect of the invention is described in FIG. 3e, in which a main carriage 2 is interposed between two auxiliary carriages 3, and the actuating means 6 capable of moving the pressing device 4 comprises a connecting rod-crank system, one for the connection of each auxiliary carriage 3 with the pressing device 4. The crank 31 is located on the main carriage 2 and the rotation axis thereof coincides with the translation axis of the pressing device 4, to which it is operatively connected. Instead, the connecting rod 30 has a first end 32 constrained to the auxiliary carriage 3 and a second end 33 connected to the crank 31 present on the main carriage 2. The variation of the relative distance between the main carriage 2 and the auxiliary carriage 3 activates the connecting rod-crank system, which in turn is capable of imparting the translation motion to the pressing device 4 owing to a conversion system 34 for converting the rotary motion in rectilinear motion comprising a screw-female screw system. In order to obtain a fluid rotary motion, i.e. free of dead centres which might interfere with the rotation up to interrupting it, the two cranks 31 are arranged mutually offset by a non-zero angle of less than 180°, preferably comprised between 45° and 135°, still more preferably 90°. In this way, when a connecting rod 30 and the respective crank 31 are in an aligned position, defining a dead centre of the mechanism, the other connecting rod 30 and the respective crank 31 will be misaligned and thus enable continuation of the movement in a fluid way. This movement is realized owing to the precise and continuous variation of the relative distance between the auxiliary carriages 3 and the main carriage 2 by the control unit 5, i.e. the activation of the linear motors defined by the carriages independently of one another.

Figure 3F:
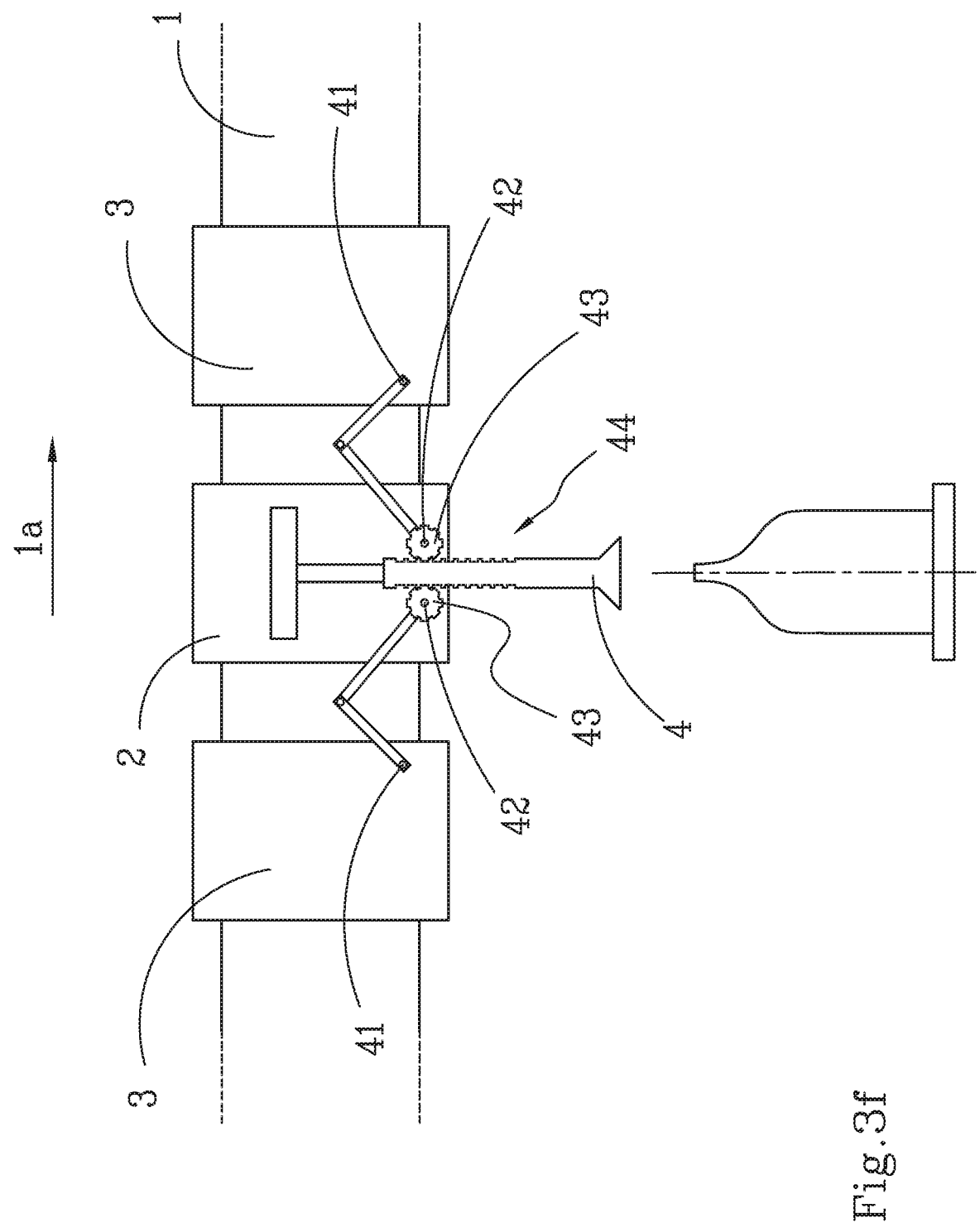
FIG. 3f illustrates, in a schematic side view, a sixth embodiment of the machine of the invention with a sixth type of actuating means.

FIG. 3f shows an aspect of the invention in which the main carriage 2 is interposed between two auxiliary carriages 3, the main carriage 2 being connected to each of them by specific actuating means 6. Such actuating means 6 comprises a linkage 40 having a first end 41 constrained to the auxiliary carriage 3 and a second end 42 constrained to a pinion 43, which is mounted on the main carriage 2 and is able to rotate about the constraining point. The variation in the relative distance between the main carriage 2 and the auxiliary carriage 3 causes the movement of the linkage 40, which induces the rotation of the pinion 43 which in turn, being associated to a counter-shaped portion 44 of the pressing device 4, determines the vertical translation of the latter.

Figure 3G:
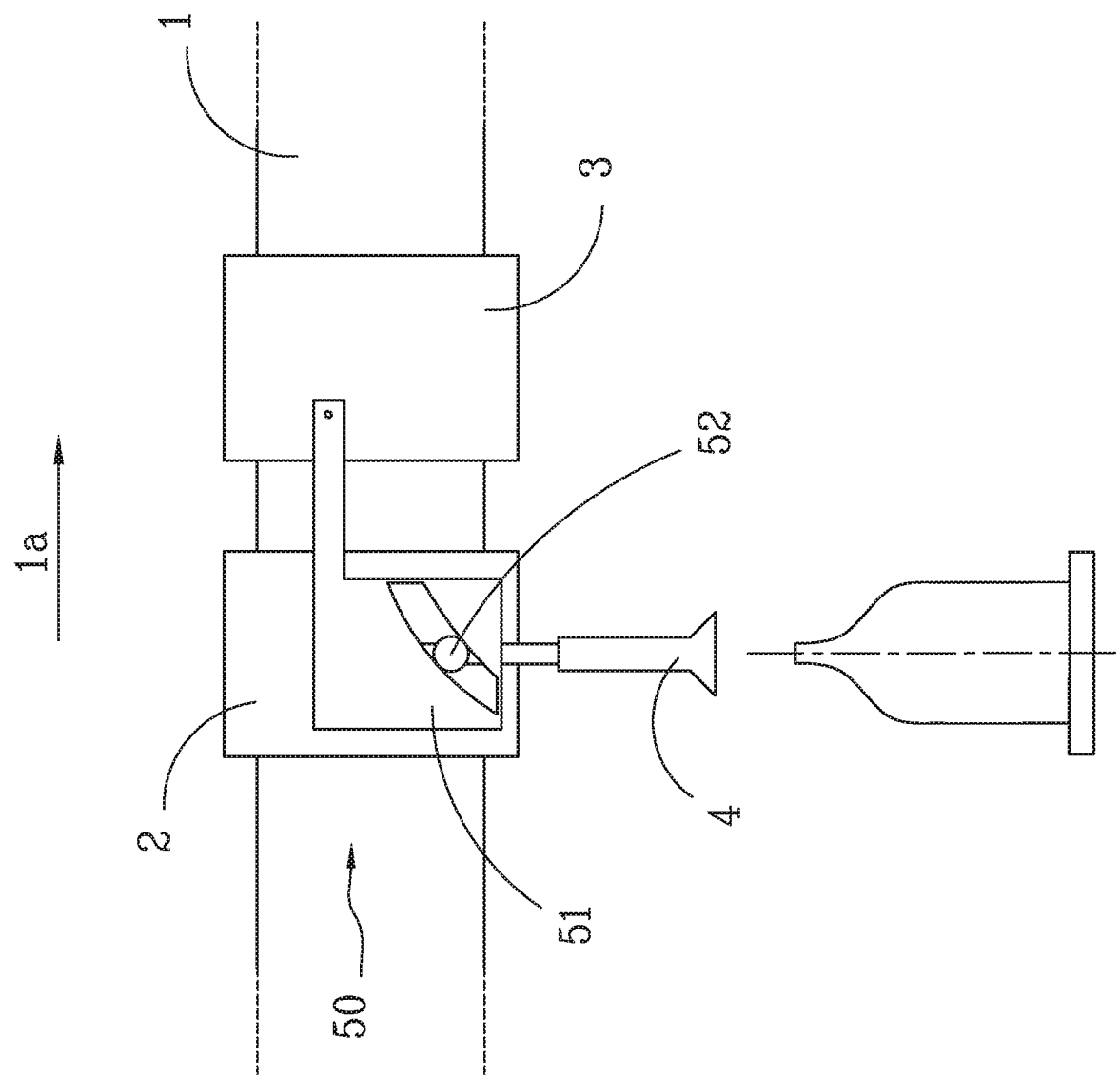
FIG. 3g illustrates, in a schematic side view, a seventh embodiment of the machine of the invention with a seventh type of actuating means.

A further viable aspect of the invention is shown in FIG. 3g, in which the actuating means 6 interposed between a main carriage 2 and an auxiliary carriage 3 comprises a cam system 50, the shaped profile 51 of which is solidly constrained to the auxiliary carriage 3 and is operatively associated to a slider 52 which is instead solidly constrained to the pressing device 4. The movement of the auxiliary carriage 3 and, consequently, of the shaped profile 51 with respect to the main carriage 2 determines the sliding of the slider 52 internally of the shape of the shaped profile 51, forcing the pressing device 4 to make a vertical translation.

Figure 3H:
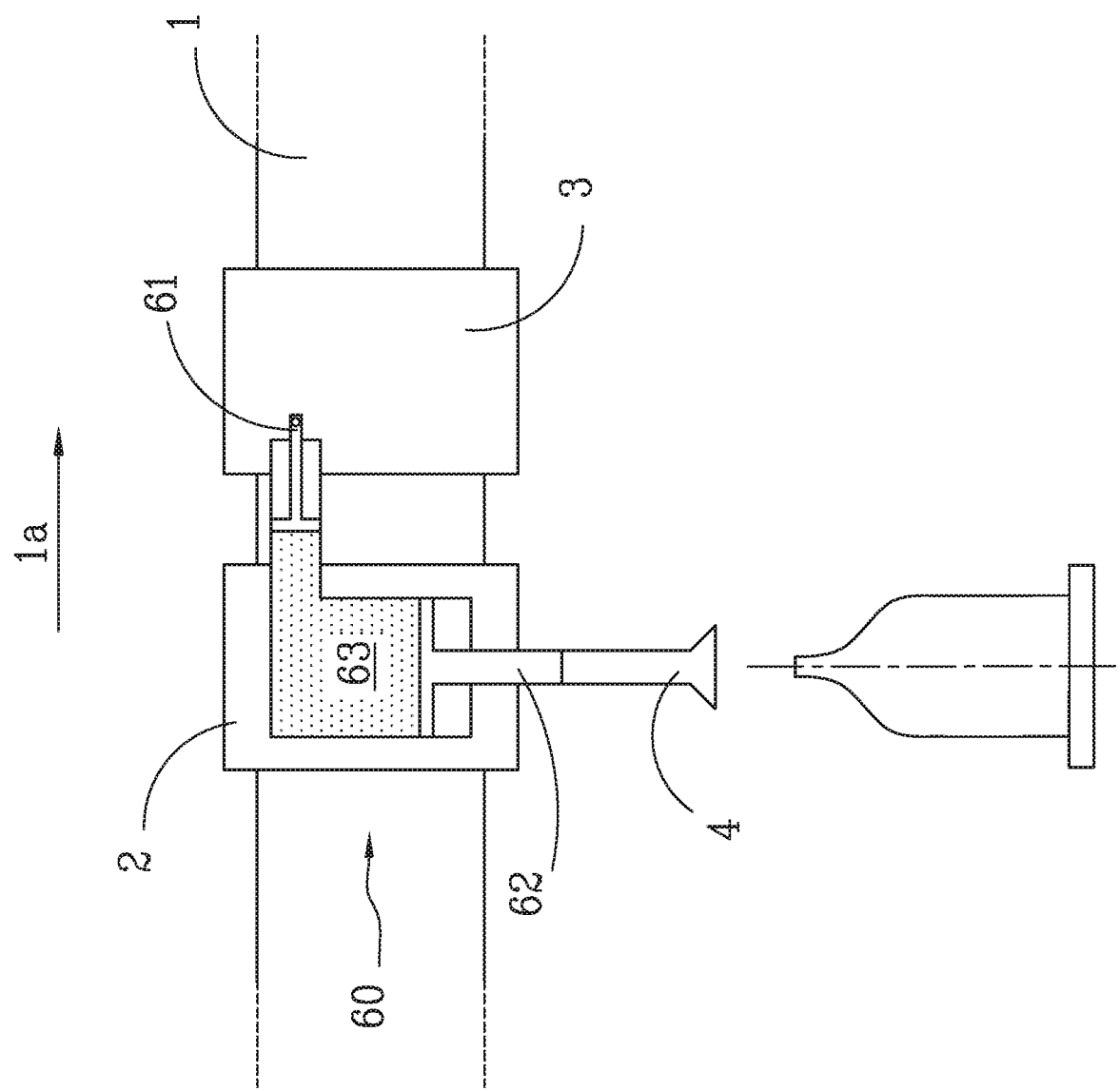
FIG. 3h illustrates, in a schematic side view, an eighth embodiment of the machine of the invention with an eighth type of actuating means.

Lastly, as illustrated in FIG. 3h, according to a further aspect of the invention the actuating means 6 comprises an actuator cylinder 60 containing a volume 63 of a compressible fluid interposed between a first piston 61 and a second piston 62. The approaching of the auxiliary carriage 3, to which the first piston 61 is connected, to the main carriage 2 determines the compression of the volume 63 of the fluid in the actuator cylinder 60 by the first piston 61, with a consequent displacement of the second piston 62, to which the pressing device 4 is connected, in order to maintain the condition of balance of the system. In this way, the horizontal translation of the first piston 61 generates a vertical translation of the second piston 62, and thus the vertical translation of the pressing device 4 between a raised rest position and a lowered constrained position.

The operation of the machine 100 is described in the following and is independent of the embodying feature considered among those set forth above.

The machine 100, according to the claims of the present patent application, is normally inserted in a broader context of a system for conveying containers in which each container is directed (by a guide 1, spacing means and an input star) on a plate of the machine 100 which transports the container along the advancement direction 1a up to an outlet star for extracting the container from the machine 100 itself.

The machine 100 preferably comprises a base guide arranged below the containers on which carriages for transport of the containers are mounted. A rotating plate is mounted on each carriage to set a respective container in rotation. Each carriage with the guide in turn defines a base linear motor for transport of the container. The guide 1 is arranged above the base guide and the two guides preferably extend substantially parallel to one another. Further, the movement of the base carriage is synchronised with the movement of the main carriage 2 so that the container remains upright.

Along the advancement direction 1a, each container passes through various units each capable of carrying out different tasks, for example, initially the first device that encounters the container is a detecting device which samples the profile of the container in the search for a recognition sign with respect to which the first label is to be applied, then the container encounters a first labelling unit which applies the first label and, possibly, other work units with different purposes.

In addition to being moved along the advancement direction 1a of the guide 1, the container is also set in rotation about a main axis thereof, so that the operating station, stationary with respect to the guide 1, can carry out the functions for which it is programmed, such as the orientation and the application of labels. As soon as the container is transferred by the input star onto the guide 1, a pressing device 4, due to actuating means 6 operatively connected, applies a pressing force from above in a downwards direction in order to keep the container in position during the movement and carrying-out of the operations in the work stations. The pressing device 4 is installed on a main carriage 2 slidably mounted on the guide 1, mirror-like with respect to the guide used for transport of the containers but superiorly distanced, as it is thus capable of following the translational and rotational movements of the container along the advancement direction 1a.

The pressing device 4 and the actuating means 6 advantageously do not comprise a spring.

Lastly the bottle is collected by the carriage from the outlet star and deposited on an outlet conveyor belt.

Any modifications or variations which, in the light of the description, are evident to the person skilled in the art, must be considered to fall within the scope of protection established by the present invention, according to considerations of technical equivalence.

The invention claimed is:

1. A machine for conveying containers, comprising:
    a guide extending along an advancement direction of the containers;
    a main carriage slidably mounted on said guide, said guide and said main carriage together defining a main linear motor;
    at least one auxiliary carriage slidably mounted on said guide, said guide and said auxiliary carriage together defining an auxiliary linear motor;
    a pressing device mounted on said main carriage and movable along an axis coinciding with a longitudinal axis of the container between a raised rest position, in which the pressing device and the container are not in contact, and a lowered constrained position in which the pressing device applies a pressing force on the top of the container;
    a control unit electrically connected to said guide and configured for controlling the sliding of said main carriage and said auxiliary carriage on said guide and a mutual distance thereof;
    actuating means operatively connected to said pressing device and configured for moving said pressing device between said raised rest position and said lowered constrained position; said actuating means being operatively interposed between said pressing device and said auxiliary carriage, and being activatable following the variation of the mutual distance between said main carriage and said auxiliary carriage; said control unit being configured for commanding the variation of the mutual distance between the main carriage and the auxiliary carriage so as to activate said actuating means;
    wherein the pressing device is rotationally independent of the axial movement between the raised rest position and the lowered constrained position.

2. The machine according to claim 1, wherein the pressing device is capable of rotating about the longitudinal axis independently of the axial movement in order to follow the rotary movement of the container.

3. The machine according to claim 1, further comprising at least two auxiliary carriages slidably mounted on said guide in such a way that said main carriage is interposed therebetween; each of the auxiliary carriages being operatively connected to said pressing device by the respective actuating means.

4. The machine according to claim 1, wherein said actuating means comprises a linkage having a first end connected to said auxiliary carriage and a second end connected to said pressing device, so that a variation of the relative distance between said main carriage and said at least one auxiliary carriage induces a displacement of the pressing device between the raised rest position and the lowered constrained position.

5. The machine according to claim 4, wherein said linkage comprises three levers; each of said three levers having a first end constrained at a same point; each of said three levers having a second end constrained at a different point between said pressing device, said main carriage and said auxiliary carriage.

6. The machine according to claim 1, wherein said actuating means comprises a rack connected to said auxiliary carriage and at least one screw-female screw movement system comprising said pressing device.

7. The machine according to claim 1, wherein said actuating means comprises at least one connecting rod and at least one crank associated to said connecting rod; said connecting rod having a first end constrained to said auxiliary carriage and a second end associated to said crank and said crank being connected to said pressing device by conversion means for converting the rotary motion into rectilinear motion.

8. The machine according to claim 7, wherein said conversion means comprises a screw-female screw movement system comprising said pressing device constrained to said main carriage so as to prevent the rotation of said pressing device and enabling the movement between said raised rest position and said lowered constrained position.

9. The machine according to claim 1, wherein said actuating means comprises a linkage having a first end constrained to said auxiliary carriage and a second end constrained to a pinion mounted rotatingly on said main carriage, said pinion being operatively associated to a threaded portion of said pressing device.

10. The machine according to claim 1, wherein said actuating means comprises a cam system having at least one shaped profile solidly constrained to the auxiliary carriage and operatively associated to a slider solidly constrained to the pressing device in order to cause movement thereof between said raised rest position and said lowered constrained position.

11. The machine according to claim 1, wherein said actuating means comprises at least one actuator cylinder comprising a first piston connected to said auxiliary carriage, a second piston connected to said pressing device and a volume of fluid interposed between said first piston and second piston.

12. The machine according to claim 1, wherein the control unit is configured to control the distance between the auxiliary carriage and the main carriage and to limit the minimum distance between the auxiliary carriage and the main carriage according to the maximum stroke that the pressing device must carry out.

13. The machine according to claim 1, wherein the control unit is configured to limit the maximum values of the magnitudes of current and voltage relative to the linear motor defined by the auxiliary carriage according to a predetermined maximum pressure value of the pressing device on the top of the container.

* * * * *

UNITED STATES PATENT AND TRADEMARK OFFICE
CERTIFICATE OF CORRECTION

PATENT NO.         : 11,104,525 B2            Page 1 of 1
APPLICATION NO.    : 16/644834
DATED              : August 31, 2021
INVENTOR(S)        : Campedelli et al.

It is certified that error appears in the above-identified patent and that said Letters Patent is hereby corrected as shown below:

On the Title Page

Item (22), PCT Filed: change "Sep. 15, 2018" to --Sep. 5, 2018--

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*